(12) United States Patent
Karapurath (10) Patent No.: US 10,626,747 B2
(45) Date of Patent: Apr. 21, 2020

(54) VARIABLE VANE ACTUATION ARRANGEMENT

(71) Applicant: ROLLS-ROYCE plc, London (GB)

(72) Inventor: Neelambaran Karapurath, Derby (GB)

(73) Assignee: ROLLS-ROYCE plc, London (GB)

( * ) Notice: Subject to any disclaimer, the term of this patent is extended or adjusted under 35 U.S.C. 154(b) by 316 days.

(21) Appl. No.: 16/133,854

(22) Filed: Sep. 18, 2018

(65) Prior Publication Data

US 2019/0112941 A1    Apr. 18, 2019

(30) Foreign Application Priority Data

Oct. 18, 2017 (GB) .................................. 1717091.1

(51) Int. Cl.
| | | |
|---|---|---|
| F01D 17/16 | (2006.01) | |
| F02C 9/22 | (2006.01) | |
| F01D 9/04 | (2006.01) | |

(52) U.S. Cl.
CPC .......... *F01D 17/162* (2013.01); *F01D 9/041* (2013.01); *F02C 9/22* (2013.01); *F05D 2260/50* (2013.01); *F05D 2260/56* (2013.01)

(58) Field of Classification Search
CPC ...... F01D 17/16; F01D 17/162; F01D 17/165; F01D 17/167; F02C 9/22; F05D 2260/50; F05D 2260/56
See application file for complete search history.

(56) References Cited

U.S. PATENT DOCUMENTS

| | | | |
|---|---|---|---|
| 3,981,140 A | | 9/1976 | Lunsford et al. |
| 7,717,669 B2 * | | 5/2010 | Sheath .................. F01D 25/04 |
| | | | 188/313 |
| 8,297,918 B2 * | | 10/2012 | Bhatnagar ............. F04D 29/563 |
| | | | 415/160 |
| 2003/0026694 A1 | | 2/2003 | Groskreutz et al. |
| 2015/0132111 A1 | | 5/2015 | Martin et al. |

FOREIGN PATENT DOCUMENTS

GB      2216604      10/1989

OTHER PUBLICATIONS

Great Britain Search Report dated Mar. 20, 2018, issued in GB Patent Application No. 1717091.1.

* cited by examiner

*Primary Examiner* — Richard A Edgar
*Assistant Examiner* — Maxime M Adjagbe
(74) *Attorney, Agent, or Firm* — Oliff PLC (57) ABSTRACT

There is disclosed a variable vane actuation arrangement 100, 200 comprising a crankshaft 48, 148 comprising a crank web 50,150 and a unison ring assembly 45 comprising a unison ring 34 moveable to vary the pitch of a plurality of variable vanes 26. A connector 42 is fixed with respect to the unison ring 34. The crank web 50, 150 and the connector 42 cooperate by a pin 56—slot 52, 152 mechanism configured so that rotation of the crankshaft 48, 148 causes rotation of the unison ring 34. There is further disclosed a gas turbine engine with a variable vane actuation arrangement.

16 Claims, 7 Drawing Sheets

VARIABLE VANE ACTUATION ARRANGEMENT

CROSS-REFERENCE TO RELATED APPLICATIONS

This application is based upon and claims the benefit of priority from British Patent Application Number 1717091.1 filed 18 Oct. 2017, the entire contents of which are incorporated by reference.

BACKGROUND

Technical Field

The present disclosure relates to a variable vane actuation arrangement for varying the pitch of variable vanes, and a gas turbine engine comprising the variable vane actuation arrangement.

Description of the Related Art

A compressor of a gas turbine engines typically comprises several compression stages. In order to optimise performance of the engine, stator vanes may be configured to pivot to vary their pitch or angle of incidence with respect to the annulus flow through the engine. One known arrangement for actuating such stator vanes is to provide a unison ring coupled to each of the stator rings and rotatable about a central axis of the engine to cause the stator vanes to pivot. One or more actuators with control rods acting on the unison ring may be disposed around the unison ring to drive rotation.

SUMMARY

According to a first aspect there is provided a variable vane actuation arrangement comprising: a crankshaft comprising a crank web; a unison ring assembly comprising: a unison ring moveable to vary the pitch of a plurality of variable vanes; and a connector fixed with respect to the unison ring; wherein the crank web and the connector cooperate by a pin-slot mechanism configured so that rotation of the crankshaft causes rotation of the unison ring. The pin-slot mechanism may comprise a through slot or may comprise a blind slot.

A guide slot of the pin-slot mechanism may determine a mode of relative movement between the connector and the crank web so that the mode of relative movement has a single degree of freedom.

The pin-slot mechanism may comprise a plurality of guide slots corresponding to different modes of relative movement between the crank web and the connector. The actuation arrangement may be configured to transition between modes of relative movement by rotation of the crankshaft so that a pin of the pin-slot mechanism is disposed at a junction between a plurality of the guide slots.

For each mode of relative movement there may be an operational range of rotational travel of the crankshaft corresponding to a range of movement of the pin along the respective guide slot separate from the junction. There may also be a service range of rotational travel of the crankshaft corresponding to a range of movement of the pin along a portion of the respective guide slot that includes the junction.

The variable vane actuation system may comprise a controller configured to limit rotation of the crankshaft to the operational range in operational use when the variable vane actuation system is installed in a gas turbine engine. The controller may be configured to permit rotation of the crankshaft to the service range when the variable vane actuation system is non-operational for servicing. The controller may be configured to receive a service instruction, and to permit rotation of the crankshaft to the service range in response to receiving the service instruction.

The variable vane actuation system may comprising a removable mechanical stop to limit rotational movement of the crankshaft to the operational range in operational use.

The pin-slot mechanism may be configured to so that in at least one mode of relative movement, rotation of the crankshaft causes non-proportional rotation of the unison ring.

The pin-slot mechanism may comprise a guide slot which has a non-linear profile, wherein the profile determines a corresponding mode of relative movement between the crankshaft and the connector. The pin-slot mechanism may comprise a guide slot which has a non-linear profile so that in at least one corresponding mode of relative movement, rotation of the crankshaft causes proportional rotation of the unison ring.

The crankshaft may comprise a plurality of crank webs spaced apart along an axial extent of the crankshaft. There may be a corresponding plurality of unison rings assemblies each moveable to vary the pitch of a respective plurality of variable vanes, and each comprising a unison ring and a connector. Each crank web may cooperate with a corresponding connector by a pin-slot mechanism configured so that rotation of the crankshaft causes rotation of the corresponding unison ring.

At least two crank webs of the plurality of crank webs may cooperate with corresponding connectors by pin-slot mechanisms having different guide slot configurations, so that rotation of the crankshaft causes different modes of relative rotation between the crankshaft and the respective unison rings.

Each of the plurality of crank webs may cooperate with a corresponding connector by a pin-slot mechanism having a plurality of guide slots corresponding to different modes of relative movement between the crank web and the connector. The pin-slot mechanism may be configured to transition between modes of relative movement by rotation of the crankshaft to a threshold transition position.

Each of the pin-slot mechanisms associated with a plurality of the crank webs may have a common threshold transition position. In other words, a ganged malschedule may be introduced upon rotation of the crankshaft to the common threshold transition position.

Each of the pin-slot mechanisms associated with a plurality of the crank webs may have different threshold transition positions. In other words, an un-ganged malschedule may be introduced upon rotation of the crankshaft to a threshold transition position.

The pin-slot mechanism may be defined by one or more guide slots in the crank web and a pin fixed with respect to the connector, wherein the pin engages the slot so that the pin is slideable within the slot.

The pin of the pin-slot mechanism may be fixed to the crankshaft or the connector by a flexible bush.

According to a second aspect there is provided a gas turbine engine comprising a variable vane actuation arrangement in accordance with the first aspect.

The disclosure may comprise any combination of the features and/or limitations referred to herein, except combinations of such features as are mutually exclusive.

DESCRIPTION OF THE DRAWINGS

Embodiments of the disclosure will now be described, by way of example, with reference to the accompanying drawings, in which.

DETAILED DESCRIPTION

Figure 1:
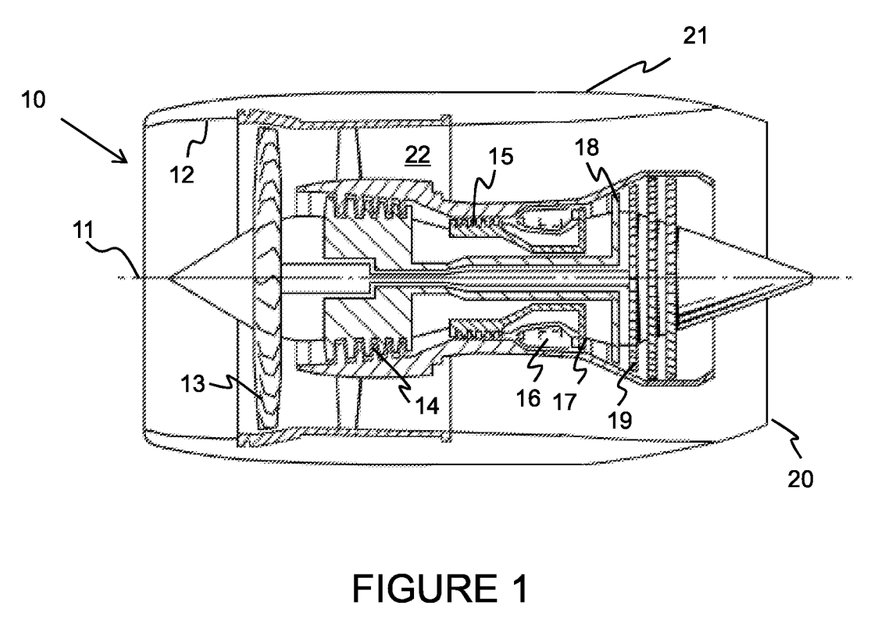
FIG. 1 schematically shows a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
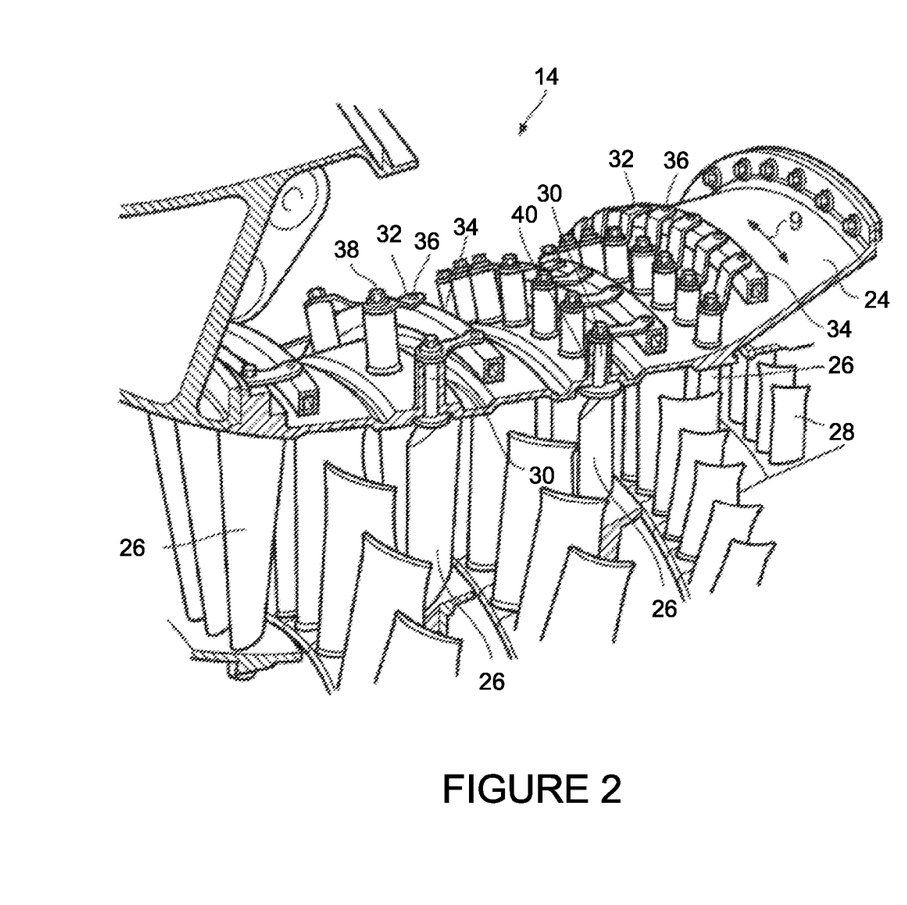
FIG. 2 schematically shows a cutaway view of an intermediate pressure compressor section in a gas turbine engine.

FIG. 2 shows a cutaway view of an example intermediate pressure compressor 14 of the gas turbine engine. In this example, the intermediate pressure compressor 14 has a casing 24 and four successive compression stages, each of which comprises a set of stator vanes 26 and a set of rotor vanes 28 downstream of the set of stator vanes 26.

Each set of stator vanes 26 comprises a plurality of stator vanes 26 which are pivotably mounted to the casing 24 around its circumference and extend radially inwardly from the casing 24. Each set of rotor vanes 28 comprises a plurality of rotor vanes 28 which are mounted to a rotatable support on a shaft (not shown) towards a radial centre of the casing 24, and are rotatable within the casing 24 around the rotational axis 11 of the engine 10.

The stator vanes 26 are variable stator vanes such that the pitch (or incidence, angle of attack) of the stator vanes 26 can be varied during use to optimise performance of the engine 10. In this example, the stator vanes 26 each comprise a vane stem 30 extending from a radially outer end of the stator vane 26 and through a bush bearing 40 in the casing 24. The vane stems 30 are each coupled to a respective lever 32 by means of a bolt 38 outside the casing 24, the lever 32 extending perpendicularly out from the vane stem 30.

A unison ring 34 extends circumferentially around the casing 24 and is rotatable around the casing 24 by a crankshaft (best shown in FIGS. 3-6) in circumferential directions indicated by arrow 9. Each compression stage has a corresponding unison ring 34. The levers 32 fixed to the stator vanes 26 in a compression stage are each pivotably coupled to the corresponding unison ring 34 of the respective compression stage by a pin 36.

To change the pitch of the variable stator vanes 26, the unison ring 34 is rotated around the casing 24 in a circumferential direction (as indicated by the arrow 9), causing the levers 32 to pivot, and therefore the stator vanes 26 to pivot and change pitch.

Figure 3:
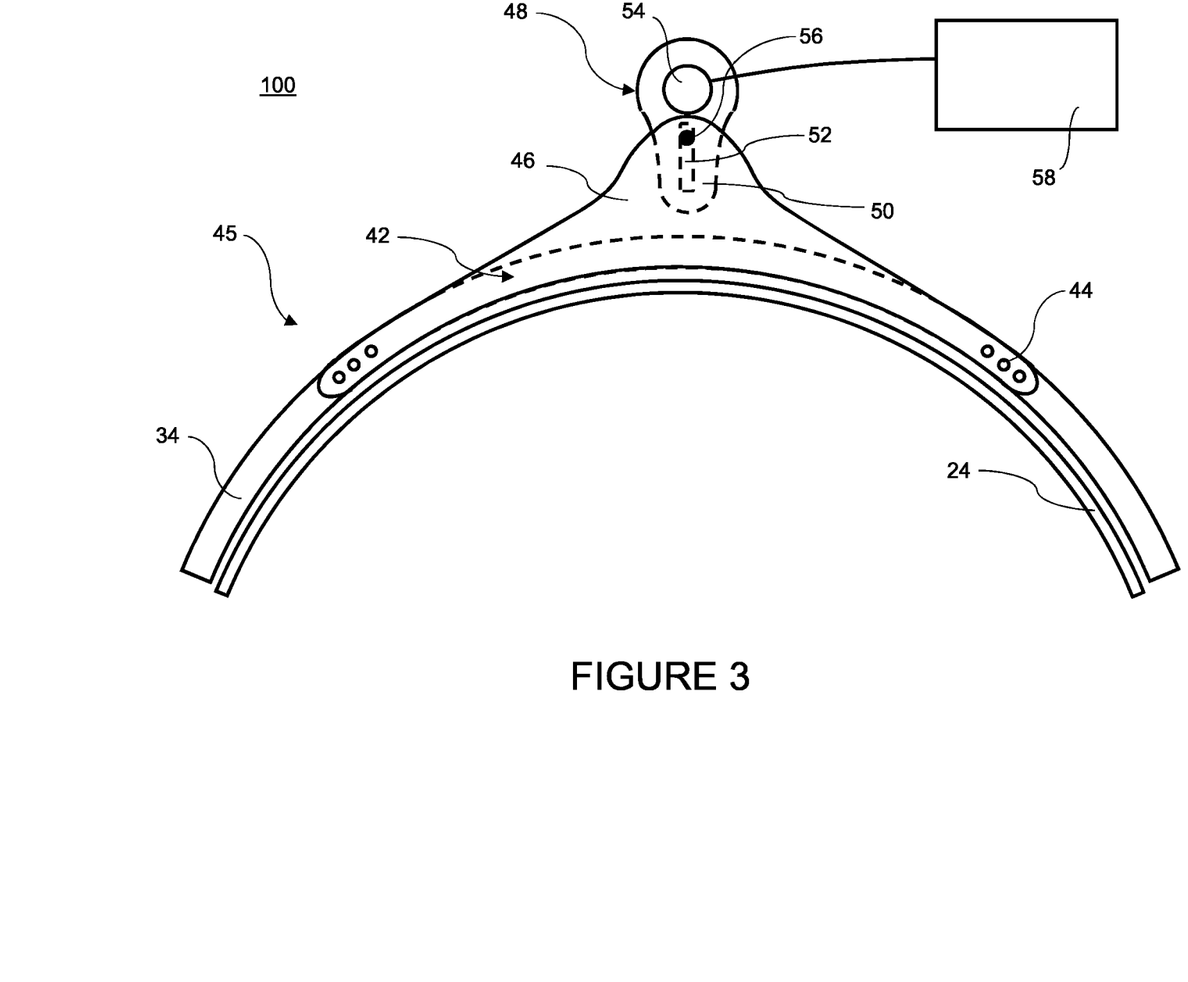
FIG. 3 schematically shows a cutaway axial view of a first example of a variable vane actuation arrangement for use in a gas turbine engine.

FIG. 3 shows an axial view of a first example variable vane actuation arrangement 100 for a compression stage in a gas turbine engine 10. The unison ring 34 extends around the circumference of the casing 24, and is concentric with the casing 24 such that it can rotate around the casing 24 about the rotational axis 11 of the engine.

A connector 42 is mounted on the unison rung 34 to transfer rotational motion to the unison ring 34. The connector 42 is in the form of a bridge plate (further described with reference to FIG. 7 below) and extends in a circumferential direction along a circumferential portion of the unison ring 34. A central portion of the bridge plate 42 extends radially outwardly from the unison ring 34 to define a connection portion 46. The bridge plate 42 is fixed to the unison ring 34, for example by bolts 44, so that the bridge plate 42 is fixed with respect to the unison ring 34 to form a unison ring assembly 45. In other examples, the connector may be fixed to the unison ring by any other suitable mechanical fastener, or by other fastening means (e.g. welding), or may be integral with the unison ring.

A crankshaft 48 is provided in fixed relation to the casing 24, and is configured to drive rotation of the unison ring 34 around the casing 24. For example, the crankshaft may be mounted on the casing 24, or another structure of the engine which is fixed with respect to the casing and the spatial footprint of the unison ring. The crankshaft 48 comprises a cylindrical shaft body 54 which is connected to an actuator (not shown) which drives rotation of the crankshaft 48 about a shaft axis, and which is controlled by a controller 58. The crankshaft 48 is disposed radially outwardly of the unison ring 34.

The crankshaft 48 comprises a crank web 50 which extends radially outwardly from the shaft body 54 with respect to the shaft axis, such that the crank web 50 provides an eccentric portion of the crankshaft 48.

In this example, the crank web 50 comprises a guide slot 52 in the form of a through-slot having a linear profile. The example slot 52 extends radially outwardly and is spaced apart from the shaft body 54. The crank web 50 in this example is profiled to accommodate the slot 52 whilst minimizing the space usage.

In other examples, the slot may be a blind slot.

The bridge plate 42 comprises a pin 56 which extends in an axial direction (with respect to the rotational axis 11 of the engine) through the slot 52 in the crank web 50 such that the bridge plate 42 and the crank web 50 cooperate by a pin-slot mechanism. The pin-slot mechanism is configured so that rotation of the crankshaft 48 causes rotation of the unison ring assembly 45, by action of the crank web 50 on the slot, and the pin 56 sliding along the slot 52. The pin-slot mechanism in this example determines (i.e. defines) a mode of relative movement between the bridge plate 42 and the crank web 50, and therefore between the unison ring assembly 45 and the crankshaft 48. The term "a mode of relative movement" is used herein to denote a predetermined pattern or relationship of relative movement between the crankshaft and the unison ring assembly, such that there is a predetermined relationship between rotation of the crankshaft and rotation of the unison ring assembly. In other words, there is a single degree of freedom for the mode of relative movement, such that the rotational position of the unison ring assembly is a function of only the rotational position of the crankshaft and thereby the crank web.

In the example configuration shown in FIG. 3, the crankshaft 48 and unison ring assembly 45 are positioned in a neutral position in which the pin 56 is disposed within the slot 52 as close as possible to the shaft axis, given the fixed positions in space of the crankshaft 48 and the unison ring 34. The neutral position corresponds to the alignment of the slot 52 with the rotational axis 11 of the engine (i.e. the axis for rotational movement of the unison ring). In other words, it corresponds to the pin 52 being aligned with a radial line from the rotational axis 11 to the shaft axis. From the neutral position, rotation of the crankshaft 48 in any direction, clockwise or anti-clockwise, results in the pin 56 moving away from the shaft body 54 of the crankshaft 48 within the slot 52.

Due to the linear profile of the slot 52 in this example, the mode of the relative movement is such that rotation of the crankshaft 48 causes a non-proportional and opposite rotation of the unison ring assembly 45. In other words, there is a non-linear relationship between rotation of the crankshaft and rotation of the unison ring assembly.

In other examples, the guide slot 52 may have a non-linear profile. In some examples, a non-linear profile may be configured to cause non-proportional rotation between the crankshaft and the unison ring assembly (i.e. a non-linear relationship between rotation of the crankshaft and rotation of the unison ring assembly). In other examples, a non-linear profile may be configured to cause proportional rotation between the crankshaft and the unison ring assembly (i.e. a linear relationship between rotation of the crankshaft and rotation of the unison ring). A guide slot may have a profile configured to define a linear relationship between rotation of the crankshaft and rotation of the unison ring assembly along only a sub-portion of a rotational travel of the crankshaft, with a further sub-portion of the rotational travel corresponding to non-linear movement.

Figure 4:
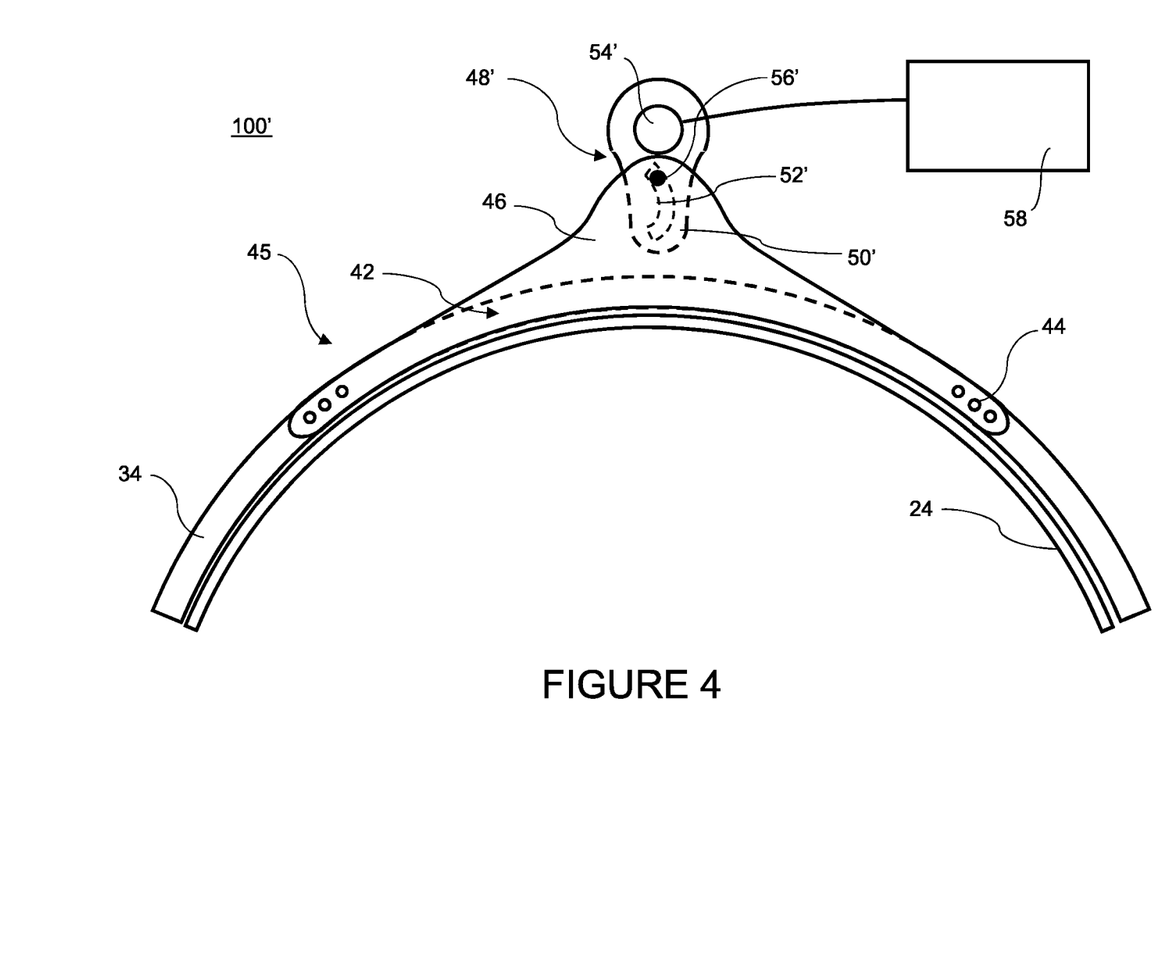
FIG. 4 schematically shows a cutaway axial view of a second example of a variable vane actuation arrangement in an operation range.

FIG. 4 shows an axial view of a second example variable vane actuation arrangement 100'. In this example, the variable vane actuation arrangement 100' comprises a unison ring assembly 45 comprising a unison ring 34 and a connector 42 which are as described above with respect to the first example variable vane actuation arrangement 100. The variable vane actuation arrangement 100' of FIG. 4 differs from that described with reference to FIG. 3 in the configuration of the crankshaft and crank web.

A crankshaft 48' comprises a shaft body 54' as described above with respect to the first example of FIG. 3. The crankshaft 48' comprises a crank web 50' which is similar to the crank web 50 of the first example, but which comprises a non-linear profiled guide slot 52'. The guide slot 52' in this example is a through slot which cooperates with the pin 56 of the unison ring assembly 45 to provide a pin-slot mechanism coupling the crank web 50' and the bridge plate 42.

In the example configuration shown in FIG. 4, the crankshaft 48' and unison ring assembly 45 are shown in a neutral position in a similar manner to the crankshaft 48 and unison ring assembly 45 described with respect to FIG. 3. Therefore, rotation of the crankshaft 48' in either direction causes corresponding rotation of the unison ring assembly 45.

Figure 5:
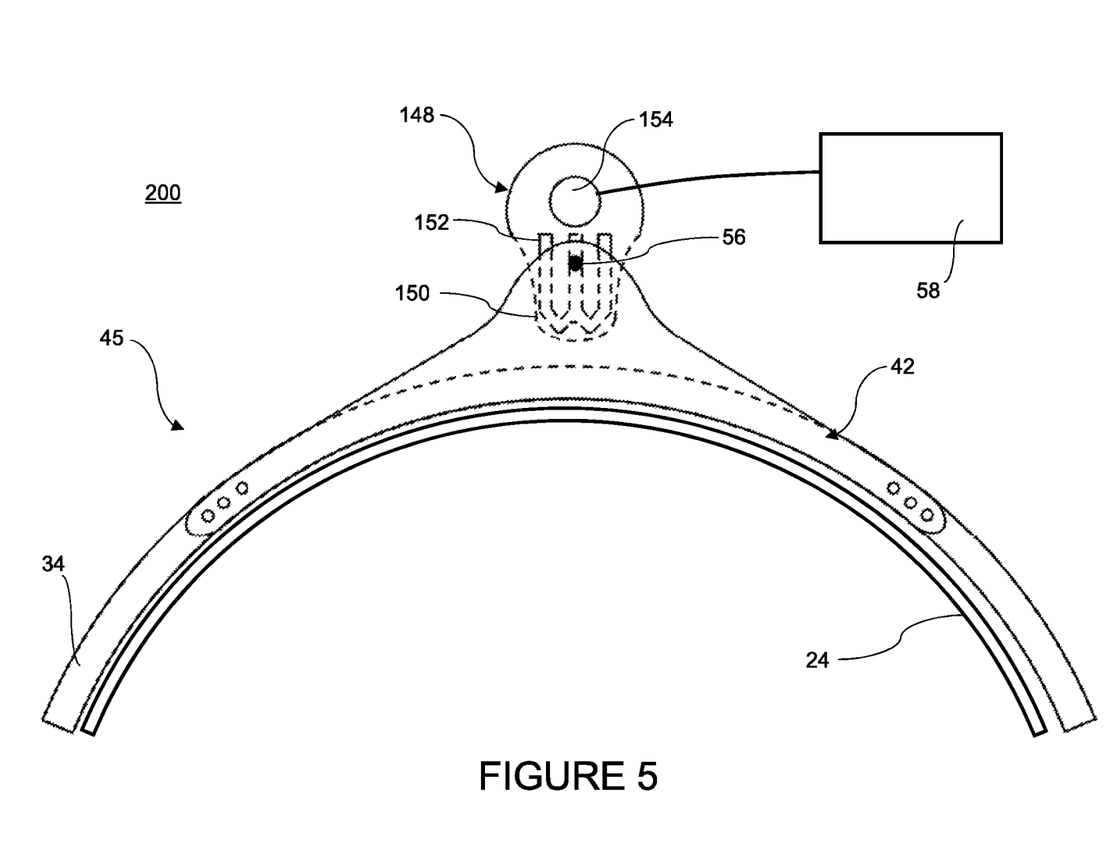
FIG. 5 schematically shows a cutaway axial view of a third example of a variable vane actuation arrangement in an operation range.
Figure 6:
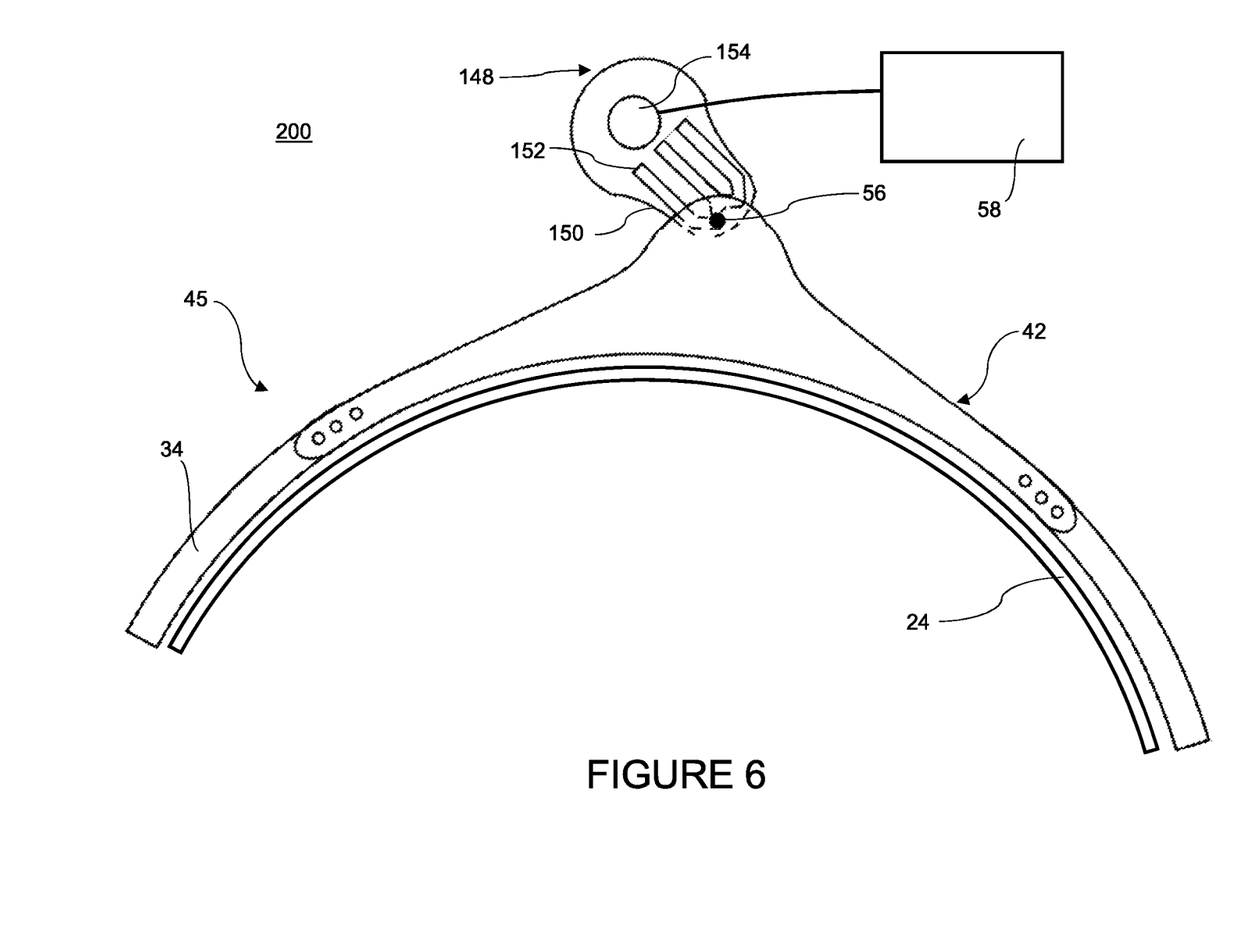
FIG. 6 schematically shows a cutaway axial view of the third example of a variable vane actuation arrangement of FIG. 5, in a service range.

FIGS. 5 and 6 show a cutaway axial view of a third example variable vane actuation arrangement 200. In this example, a unison ring assembly 45 comprises a unison ring 34 and a bridge plate 42 which are as described above with respect to the first example variable vane actuation arrangement 100 in FIG. 3. The variable vane actuation arrangement 200 of FIGS. 4 and 5 differs from that described above with respect to FIG. 3 in the configuration of the crankshaft and crank web.

A crankshaft 148 comprises a shaft body 154 which is as described above with respect to the first example of FIG. 3. The crankshaft 148 comprises a crank web 150 which is similar to the crank web 50 of the first example to the extent that the crank web 150 comprises a guide slot 152 in the form of a through slot which cooperates with the pin 56 of the unison ring assembly 45 to provide a pin-slot mechanism coupling the crank web 150 and the bridge plate 42.

In this example, the pin-slot mechanism comprises a plurality of slots 152 which meet at respective junctions. In this example, the slots 152 define a substantially W-shaped profile having three legs which are positioned side by side and substantially parallel to one another and which are connected at a distal end of the legs by two v-shaped junction regions. Each slot 152 is considered to comprise one of the legs and a corresponding portion of the junction regions. Each guide slot 152 is configured to cooperate with the pin 56 of the bridge plate 42 to determine a respective mode of relative movement between the bridge plate 42 and the crank web 150.

In FIG. 5, the pin 56 of the bridge plate 42 is disposed in the leg of the central slot 152 and the crank web 150 and unison ring assembly 45 are positioned such that the variable vane actuation arrangement 200 is in the neutral position for that slot 152.

From the neutral position, rotation of the crankshaft 148 in either a clockwise or anti-clockwise direction is possible. Movement of the crankshaft 148 in either direction causes the pin 56 to slide through the slot 152 away from the shaft body 154, to cause corresponding rotation of the unison ring assembly 45 according to a first mode of movement relative the crankshaft 148.

The crankshaft 148 can rotate in either direction from the neutral position within an operational range of rotational travel. In this example, the operational range is determined by the controller 58, which is configured to limit rotation of the crankshaft 148 to within a predetermined operational range. The pin-slot mechanism is configured so that, in the operational range of rotational travel, the pin 56 is limited to slide through an operational portion of the slot 152 which is separate from the junction regions. In this example, the operational portions of the respective slots 152 are the respective linear portions or "legs", including the neutral position.

During operational use of the gas turbine engine, the controller 58 controls rotation of the crankshaft 148 and is configured to permit rotation of the crankshaft 148 within the operational range, and to prevent movement of the crankshaft 148 beyond a soft stop threshold corresponding to a service portion of the respective slot, which includes the or each respective junction region. This ensures that, during use, the unison ring 34 rotates in only one mode of movement relative the crankshaft 148 corresponding to the respective slot 152 which the pin 56 engages, and to which it is effectively limited.

The controller 58 is configured to selectively permit the crankshaft to rotate outside of the operational range (and away from the neutral position) beyond the soft stop threshold into a service range as shown in FIG. 6, such that the pin 56 moves to one of the junctions regions. For example, a controller 58 may be configured to do so upon receipt of a service instruction received from a remote computer or by manual input to the controller. For example, a service instruction may specify a mode of relative movement to transition to, or may specify a sequence of rotations that, when carried out, cause rotation of the crankshaft to transition to a different mode of relative movement.

Rotation of the crankshaft 148, for example in an anti-clockwise direction, away from the neutral position and beyond the soft stop threshold causes the pin 56 to move from the leg of a first slot 152 (i.e. from the operational portion of the central slot 152) into the junction region (movement to the left hand junction region is shown in FIG. 6). In this example, the junction region is v-shaped to define a junction between two adjacent slots at an apex of the "v". Accordingly, continued rotation of the crankshaft 148 as described above causes the pin 56 to move to the junction, where the pin 56 is stopped by abutment with the wall of the slot. Accordingly, in this example the junction provides a hard stop, where contact between the pin 56 and the slot 152 prevents any further rotation of the crankshaft 148.

With the pin 56 at the junction (as shown in FIG. 6) the crankshaft is in a threshold transition position from where rotation of the crankshaft 148 back towards the neutral position (in this example, in a clockwise direction) causes the pin 56 to move along the other side of the junction and to thereby move into the leg of a second adjacent slot 152, (the left slot 152 as shown in FIG. 6). With the pin 56 disposed in the second slot 152, when the crankshaft 148 moves within the corresponding operational range, the pin 56 cooperates with the second slot such that the unison ring 34 moves in a second mode of movement relative the crankshaft 148, as determined by the profile and cooperation of the pin 56 and the second slot 152.

In this example, the slots 152 are configured so that the path of the slot from one slot and junction region to another depends on the direction of rotational movement. In particular, it will be appreciated that when the crankshaft 148 rotates in a first direction (e.g. anti-clockwise), the pin 56 acts against and slides along a corresponding first wall of a slot 152. In contrast, when the crankshaft 148 rotates in an opposite second direction (e.g. clockwise), the pin 56 shall act against and slide along an opposing second wall of the same slot 152. Accordingly, the direction of the pin 56 through the slots 152 and junction regions is determined by the direction of rotation of the crankshaft.

As described above, the crank web 150 is configured so that, with the pin 56 disposed in the leg of the first (central) slot 152, anti-clockwise rotation of the crankshaft 148 causes the pin 56 to move into the left-hand slot region as shown in FIGS. 4 and 5. Conversely, the crank web 150 is configured so that, when the pin 56 is disposed within the leg of the first (central) slot 152 as shown in FIG. 5, rotating the crankshaft 148 from the neutral position in a clockwise direction and beyond the soft stop causes the pin 56 to move into the right hand junction region shown in FIG. 6, and to the junction between the first slot 152 and a third slot 152 (the right hand slot in FIG. 6). Further rotating the crankshaft 148 back to the neutral position (anti-clockwise) will move the pin 56 into the leg of the third slot, so that the pin-slot mechanism defines a third mode of relative movement.

Therefore, rotating the crankshaft 148 to the threshold transition position, beyond the soft stop threshold and into the service range allows the controller 58 to change the mode of movement of the unison ring 34 without having to make manual adjustments to the variable vane actuation arrangement 200.

This may be desirable in testing, for example, to introduce an intentional malschedule (i.e. a non-optimum relationship between rotation of the crankshaft and pivoting of the variable vanes) to the unison ring 34 to test the robustness of the compressor stage when the pitch of the stator vanes is deviated from an ideal or baseline schedule.

In other examples, the legs of a multi-mode set of guide slots may all have non-linear profiles, or some may have linear profiles whilst others have non-linear profiles. In yet other examples, there may only be two legs or more than three legs. The profiles of the legs determine the modes of movement available for the unison ring relative the crankshaft. In yet further examples, the junction regions between the legs may have different configurations, such as a rounded profile rather than a v-shape profile.

Figure 7:
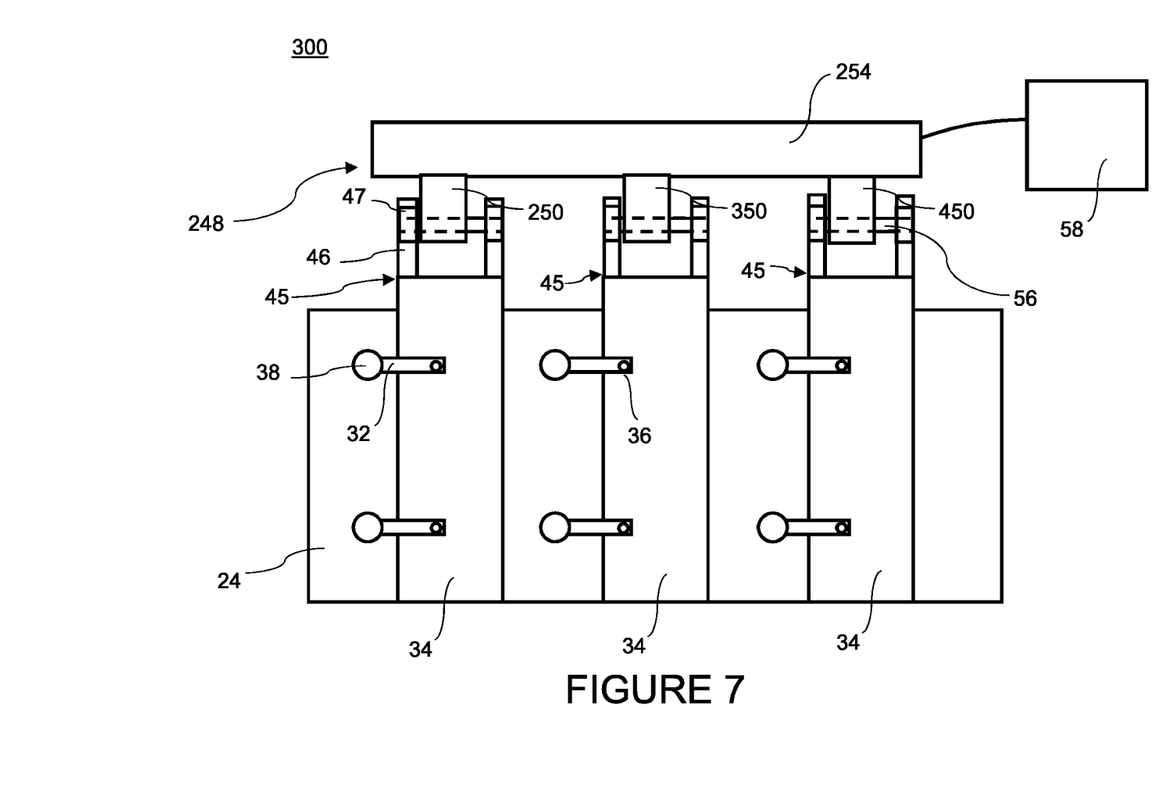
FIG. 7 schematically shows a longitudinal view of an example variable vane actuation arrangement.

FIG. 7 shows a partial view of an actuation arrangement within a gas turbine engine, as viewed along a radial direction towards the central rotational axis 11 of the engine. The engine comprises a casing 24 disposed around three compression stages. The variable vane actuation arrangement 300 spans the three compression stages to vary the pitch of vanes in each respective compression stage. Each compression stage is associated with a unison ring assembly 45 having a unison ring 34 and a connector 42 in the form of a bridge plate as described above with reference to FIGS. 3-6.

Each unison ring 34 is coupled to a respective plurality of variable stator vanes by levers 32. Each lever 32 is coupled to the respective unison ring 34 with a pin 36, and is pivotably connected the respective stator vane through the casing 24 with bolts 38 as described above with reference to FIG. 2. For simplicity, two levers 32 are shown in FIG. 7 per unison ring 34. However, any number of levers 32 can be attached to each unison ring 34, preferably as many levers 32 as there are stator vanes 26 in each compression stage. Rotation of the unison ring 34 around the casing 24 causes rotation of the levers 32 around the bolts 38 which pivots the variable stator vanes 26 as described above.

The connection portions 46 of the bridge plates 42 extend radially outwardly from the respective unison rings 34 as described with reference to FIG. 3. The connection portions 46 each comprise two members axially spaced apart (with respect to the central rotational axis 11 of the engine) on either side of the respective unison ring 34. A pin 56 of each connection portion 46 extends between the members and is fixed to the connection portion 46 by a flexible bush 47. In other examples, the pin may be integral with the connection portion or may be fixed to it by any other means, such as a weld.

A crankshaft 248 comprises a shaft body 254 as described above with respect to FIGS. 3-6, which spans the three compression stages for actuation the respective unison rings. The crankshaft 248 comprises three crank webs 250, 350, 450, which are axially spaced apart along the length of the crankshaft 248 such that there is one crank web 250, 350, 450 associated with each of the unison rings 34 for each of the three compression stages.

The crank webs 250, 350, 450 each extend between the two members of the respective bridge plate 42 so that the respective pin 56 is received in a guide slot (not shown) of the crank web. The pin 56 and respective slot associated with each unison ring thereby define a pin-slot mechanism which determines the modes of movement available to each of the unison rings 34.

Since each of the crank webs 250, 350, 450 is connected to the same shaft body 254, rotation of the crankshaft 248 results in simultaneous rotation of the each of the crank webs 250, 350, 450.

In some examples, the guide slots of the crank webs 250, 350, 450 comprise legs having a linear profile as described in FIG. 3. In other examples, the legs may have a non-linear slot, for example as described above with respect to FIG. 4. In some examples, the guide slots may be a multi-mode slot 152 as described in FIGS. 5 and 6. Each of the crank webs 250, 350, 450 may have the same configuration of slots so that the mode of movement for each of the unison rings 34 is the same when the crankshaft 248 is rotated. In other examples, at least two of the crank webs 250, 350, 450 may have different guide slot configurations so that rotation of the crankshaft 248 causes different modes of relative rotation between the crank webs 250, 350, 450 and the respective unison rings 34. In yet further examples, at least two of the crank webs 250, 350, 450 may have a multi-mode guide slot so that the corresponding unison rings 34 can transition between modes by the crankshaft moving to the threshold transition position for each of the crank webs 250, 350, 450.

The crank webs 250, 350, 450 may have common threshold transition positions or they may have different threshold transition positions. In other words, the crank webs may be configured so that, for each crank web, the respective pin reaches the respective transition position at the same angular position of the crankshaft, such that each unison ring can be switched to a different mode of relative movement substantially simultaneously. This may be referred to as a ganged arrangement, and may be used to introduce a ganged malschedule to the rotation of each of the unison rings. In other examples, at least two crank webs may define different transition positions, such that one of the crank webs can be rotated to switch from one mode of relative movement to another, without necessarily causing corresponding switching with respect to the other unison ring.

The crank webs 250, 350, 450 could have any combination of guide slots which have been described in this application to suit the needs of the separate compression stages.

The thickness of each of the crank webs 250, 350, 450 in FIG. 7 is smaller than the axial separation of the prongs of the connection portion 46. This permits the unison ring 34 to move axially along the casing 24 as well as rotate around the casing 24 to allow for the rotation of the levers 32 when the unison ring 34 is driven to rotate.

It should be appreciated that the variable vane actuation arrangement can extend along any number of compression stages with a corresponding number of crank webs and unison ring assemblies.

Whilst examples have been described in which a pin-slot mechanism is defined between a crank web comprising a slot and a connector fixed to a unison ring comprising a pin, it will be appreciated that in other examples a pin-slot mechanism can be defined between a crank shaft and a unison ring in other configurations. In particular, a crank web or arm may comprise a pin, and a connector fixed to a unison ring may comprise a corresponding slot, or a plurality of slots.

We claim:

1. A variable vane actuation arrangement comprising:
a crankshaft comprising a crank web;
a unison ring assembly comprising:
a unison ring moveable to vary the pitch of a plurality of variable vanes; and
a connector fixed with respect to the unison ring;
wherein the crank web and the connector cooperate by a pin-slot mechanism configured so that rotation of the crankshaft causes rotation of the unison ring, and a guide slot of the pin-slot mechanism determines a mode of relative movement between the connector and the crank web so that the mode of relative movement has a single degree of freedom,
wherein the pin-slot mechanism comprises a plurality of guide slots corresponding to different modes of relative movement between the crank web and the connector, and
wherein the actuation arrangement is configured to transition between modes of relative movement by rotation of the crankshaft so that a pin of the pin-slot mechanism is disposed at a junction between a plurality of guide slots.

2. The variable vane actuation system according to claim 1, wherein for each mode of relative movement there is:
an operational range of rotational travel of the crankshaft corresponding to a range of movement of the pin along the respective guide slot separate from the junction, and
a service range of rotational travel of the crankshaft corresponding to a range of movement of the pin along a portion of the respective guide slot that includes the junction.

3. The variable vane actuation system according to claim 2, comprising a controller configured to limit rotation of the crankshaft to the operational range in operational use when the variable vane actuation system is installed in a gas turbine engine.

4. The variable vane actuation system according to claim 2, comprising a controller configured to permit rotation of the crankshaft to the service range when the variable vane actuation system is non-operational for servicing.

5. The variable vane actuation system according to claim 4, wherein the controller is configured to receive a service instruction, and to permit rotation of the crankshaft to the service range in response to receiving the service instruction.

6. The variable vane actuation arrangement according to claim 1, wherein the pin-slot mechanism is configured so that in at least one mode of relative movement, rotation of the crankshaft causes non-proportional rotation of the unison ring.

7. The variable vane actuation arrangement according to claim 1, wherein at least one of the plurality of the guide slots which has a non-linear profile, and wherein the non-linear profile determines a corresponding mode of relative movement between the crankshaft and the connector.

8. The variable vane actuation arrangement according to claim 7, wherein at least one of the plurality of the guide slots which has a non-linear profile so that in at least one corresponding mode of relative movement, rotation of the crankshaft causes proportional rotation of the unison ring.

9. The variable vane actuation arrangement according to claim 1, wherein the crankshaft comprises a plurality of crank webs spaced apart along an axial extent of the crankshaft;
- wherein there are a corresponding plurality of unison rings assemblies each moveable to vary the pitch of a respective plurality of variable vanes, and each comprising a unison ring and a connector; and
- wherein each crank web cooperates with a corresponding connector by a corresponding pin-slot mechanism configured so that rotation of the crankshaft causes rotation of the corresponding unison ring.

10. The variable vane actuation arrangement according to claim 9, wherein at least two crank webs of the plurality of crank webs cooperate with corresponding connectors by pin-slot mechanisms having different guide slot configurations, so that rotation of the crankshaft causes different modes of relative rotation between the crankshaft and the respective unison rings.

11. The variable vane actuation arrangement according to claim 9, wherein each of the plurality of crank webs cooperates with a corresponding connector by a pin-slot mechanism having a plurality of guide slots corresponding to different modes of relative movement between the crank web and the connector, and wherein the pin-slot mechanism is configured to transition between modes of relative movement by rotation of the crankshaft to a threshold transition position.

12. The variable vane actuation arrangement according to claim 11, wherein each of the pin-slot mechanisms associated with the plurality of the crank webs have a common threshold transition position.

13. The variable vane actuation arrangement according to claim 11, wherein each of the pin-slot mechanisms associated with the plurality of the crank webs have different threshold transition positions.

14. The variable vane actuation arrangement according to claim 1, wherein the plurality of the guide slots are defined in the crank web and a the fixed with respect to the connector, and wherein the pin engages the guide slot so that the pin is slideable within the guide slot.

15. The variable vane actuation arrangement according to claim 1, wherein the pin of the pin-slot mechanism is fixed to the crankshaft or the connector by a flexible bush.

16. A gas turbine engine comprising the variable vane actuation arrangement in accordance with claim 1.

\* \* \* \* \*